Patented Dec. 16, 1941

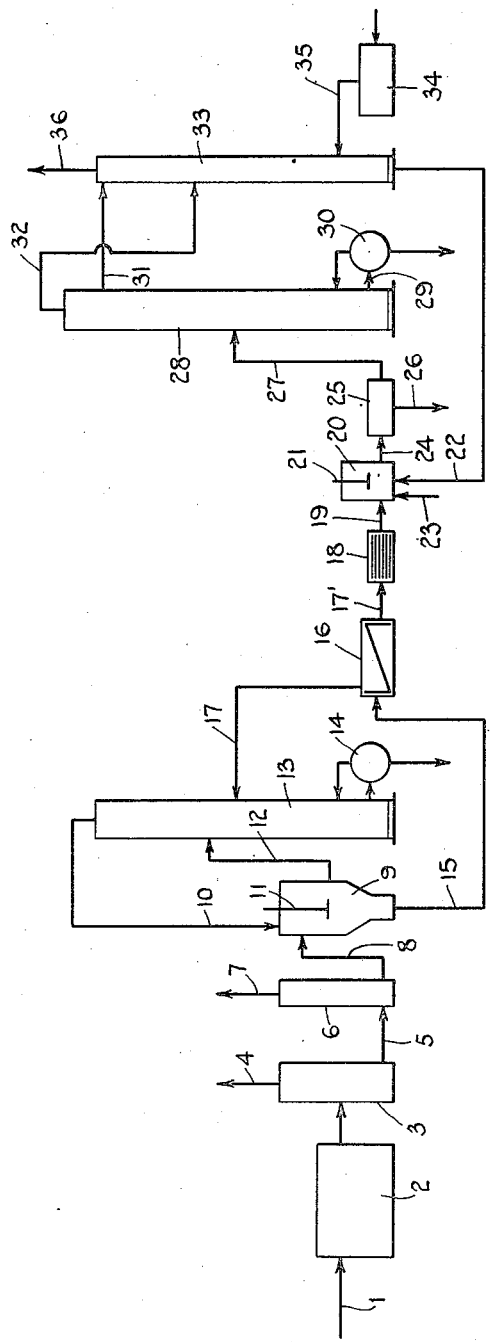

2,266,718

UNITED STATES PATENT OFFICE 2,266,718

TREATMENT OF ALIPHATIC ACIDS AND THEIR SALTS

Joseph E. Bludworth, Cumberland, Md., assignor to Celanese Corporation of America, a corporation of Delaware Application February 21, 1939, Serial No. 257,619

7 Claims. (Cl. 260—541)

This invention relates to the treatment of solutions of aliphatic acids and their salts and relates more particularly to the preparation of aliphatic acids of relatively high concentration from relatively dilute solutions of the same and also to the liberation of free aliphatic acids from the metallic salts thereof.

An object of my invention is the concentration of relatively dilute solutions of aliphatic acids and of their salts in an expeditious manner whereby products of high purity are attained.

A further object of my invention is the formation of metallic salts of aliphatic acids that are substantially free of water from aqueous solutions of the same without resort to evaporation.

A further object of my invention is to liberate free aliphatic acid from salts thereof by means of an acidic material such as sulphur dioxide whereby the purity of the product obtained and the cost of the operation are greatly improved.

Other objects of my invention will appear from the following detailed description.

On the drawing there is shown diagrammatically an apparatus for carrying out one mode of my invention.

Economic processes for the concentration of dilute acetic acid are of very great importance, and in fact the existence of such processes is practically essential if the production of certain acetic acid derivatives, and particularly cellulose acetate, is to be effected successfully from a commercial point of view. In the production of cellulose acetate, for instance, a quantity of dilute acetic acid at least of the order 10 times the quantity of cellulose acetate is obtained as a by-product. It will be appreciated that this acid must be concentrated at very small cost for further use if the cellulose acetate is to be sold at a low price. Even the saving of a fraction of a cent per pound in the concentration of acetic acid may make all the difference between commercial success and failure in the production and marketing of cellulose acetate.

However, the process of this invention is of particular importance with respect to the concentration of a dilute acetic acid obtained from the oxidation of hydrocarbons or from the destructive distillation of wood. In the concentration of dilute acetic acid from the destructive distillation of wood, as heretofore commonly practiced, lime was mixed with the dilute acid liquors to form calcium acetate. The water was then evaporated from the calcium acetate which then crystallized. Sulphuric acid was then added to the crystallized calcium acetate and the whole placed in cast iron retorts and distilled under vacuum with the aid of heat indirectly applied, for example, superheated steam, oil, etc. During this retorting decomposition products are driven off together with the acetic acid and some water.

I have found that sulphur dioxide may be employed instead of sulphuric acid for liberating acetic or other aliphatic acid from their salts. This involves many advantages over the use of sulphuric acid for this purpose, among which may be mentioned (1) greatly reduced cost of sulphur dioxide over sulphuric acid, (2) because of its quick action, the use of sulphur dioxide permits a substantially continuous process, while the sulphuric acid process is substantially a batch process, (3) the use of sulphuric acid requires expert control, since the use of either excess or too little sulphuric acid is wasteful, while an excess of sulphur dioxide may be employed without waste since it is easily recovered, (4) sulphuric acid destroys some of the other organic compounds which may be present while these are unaffected by sulphur dioxide, (5) sulphuric acid must be employed while diluted with substantial quantities of water and thus there is produced aliphatic acid which is much more dilute than those produced when sulphur dioxide is used.

I have further found that aqueous solutions of the metallic salts of aliphatic acids, such as calcium acetate, need not be evaporated to dryness to obtain dry crystals, but that these may be produced by precipitating the same by means of acetone or other organic liquids which are miscible with water but in which the metallic salts are substantially insoluble. This is of great advantage since the evaporation to dryness of these solutions is quite expensive because of the fine control necessary. Moreover, if relatively non-volatile organic substances, such as glycol or polymerized formaldehyde, are present, these do not evaporate but remain behind and tend to decompose under the heat of drying, whereas when the solutions are treated with acetone or other organic liquid to precipitate the salts, these organic materials are dissolved in the acetone from which they can be subsequently removed quite readily.

If a relatively dilute aqueous solution of acetic or other aliphatic acid is used, it may first be neutralized with an alkaline material such as the hydroxides or carbonates of calcium, sodium or potassium and the resulting solution of the salt evaporated to a relatively concentrated solution, which in the case of calcium acetate may be from 20 to 35% concentration.

To form a dry salt from the concentrated aqueous solution, there is added an organic liquid that is miscible with water but in which the salt does not dissolve to an appreciable extent, the amount of liquid added being sufficient to cause the salt to precipitate, the salt being removed from the liquid and dried. An example of a suitable liquid in the case of calcium acetate is acetone or other ketone. Examples of other suitable liquids are methyl alcohol, ethyl alcohol or other alcohols. The salt so obtained is in such condition that it may be pulverized readily.

To liberate free aliphatic acid from the substantially dry salt, whether produced from aqueous solutions or by any other method, it is treated preferably while in finely divided form with an amount of sulphur dioxide equal to but preferably in excess of that theoretically required to react with the salt of the aliphatic acid. This reaction is carried out in the presence of a restricted amount of water, the amount of water present being from the theoretical amount required to convert the sulphur dioxide that enters into the reaction to sulphurous acid to three times such amount. The addition of larger amounts is disadvantageous as it not only tends to dilute the resulting acid, but the use of excess water tends to cause the finely divided salt to agglomerate. Best results are obtained when the water is added to the reaction mixture in the form of steam, especially when an organic carrier for the sulphur dioxide, as described below, is used, since the addition of water in liquid form tends to combine with and agglomerate the salt so that it is no longer suspended in the medium containing the sulphur dioxide with which it is supposed to react.

Calcium acetate and some other salts of aliphatic acids are quite hygroscopic, and in order to finely divide and mix both the salt and sulphur dioxide, the salt is preferably treated while suspended in an organic liquid in which the sulphur dioxide is dissolved. The organic liquid employed is one in which the sulphur dioxide is soluble and which preferably has little solubility in water. The organic liquid that is used as the carrying agent is preferably saturated with dry sulphur dioxide prior to the addition of the calcium acetate or other salt. Examples of suitable carrying agents are ethyl acetate, methyl acetate or their esters, benzene, xylene, carbon tetrachloride, ethylene chloride, ethyl ether or other ethers, and acetic acid.

In order further to illustrate my invention, but without being limited thereto, the following example is given.

*Example*

To dilute residual aqueous liquid resulting after separation of the volatile materials resulting from the oxidation of hydrocarbons in the presence of a large volume of steam as described in my Patents Nos. 2,128,908 and 2,128,909 both of September 6, 1938, is treated with milk of lime. The resulting mixture may comprise water 97.4%, calcium acetate 1.8%, glycol 0.4% and polymerized formaldehyde 0.45. As a particular example, 82,726 pounds of this mixture enter by pipe 1 to furnace heater 2 and thence to separator 3, where 72,240 pounds of steam are exhausted by pipe 4. This steam, which may be at high pressure, may be used in the process of oxidizing further quantities of hydrocarbons.

From the base of the separator 3, the solution, which contains 15% of calcium acetate is led by pipe 5 to a conventional evaporator 6 where it is concentrated to a 30% solution, while the 4920 pounds of low pressure steam leaving the pipe 7 may be used for any desired purpose. The resulting 1476 pounds of alcium acetate solution of 30% concentration is led from the evaporator 6 by pipe 8 to the mixer 9 where 400 gallons of acetone are introduced by pipe 10, the mixture being agitated by stirrer 11, and whereby the calcium acetate precipitate.

From the agitator 9, the supernatant liquid comprising aqueous acetone containing the glycol and polymerized formaldehyde dissolved therein is conducted continuously by pipe 12 to the column still 13, where approximately 400 gallons of acetone recycle overhead by pipe 10 to agitator 9 (any deficiency due to loss being made up by addition of fresh acetone). The residual aqueous solution containing glycol and polymerized formaldehyde is conducted from reboiler 14 for storage or treatment.

The calcium acetate that is wetted with about 21 gallons of acetone from the base of the agitator 9 is conducted by conduit 15 to the dryer 16, and the acetone there evaporated is led by pipe 17 to the distilling column 13 for reuse. The dry calcium acetate is led from the dryer 16 by conductor 17', to the rod mill 18 where it is comminuted to a powder.

From the mill 18, the pulverized calcium acetate is led continuously by means of the conduit 19 to reactor 20 provided with agitator 21, where it is treated with 290 gallons of a saturated solution of sulphur dioxide in methyl acetate supplied by the pipe 22 and 800 pounds of steam introduced by pipe 23. The reaction rate is so very high that the calcium acetate is completely reacted on during the short interval of entry, agitation and discharge from the reactor 20 by conduit 24.

The mixture is led by conduit 24 to the slow speed centrifugal separator 25, where 1300 pounds of calcium sulphite, $CaSO_3.2H_2O$, are withdrawn by conduit 26. The mixture of methyl acetate and acetic acid containing some sulphur dioxide is led from the centrifugal separator 25 by pipe 27 to the distilling column 28 where the acetic acid is separated at the base and recirculated by pipe 29 to the reboiler 30 from which it is sent to storage. Some methyl acetate leaves the column by pipe 31 and a mixture of methyl acetate and sulphur dioxide leaves the top of the column by pipe 32, both of these pipes connecting to the absorber 33, where 540 pounds of sulphur dioxide generated by burning 270 pounds of sulphur in burner 34 and conducted by pipe 35 to the absorber 33, is absorbed. The unabsorbed nitrogen from the air used in burning the sulphur is vented through pipe 36. The solution of sulphur dioxide in methyl acetate is conducted from the base of the absorber 33 by pipe 22 to the reactor 20.

It is to be understood that the foregoing detailed description and example are merely given by way of illustration and many alterations may be made therein without departing from the spirit of my invention.

Having described my invention, what I desire to secure by Letters Patent is:

1. Process for the recovery of aliphatic acids from aqueous solutions thereof, which comprises neutralizing an aqueous solution of an aliphatic acid to form the aliphatic acid salt of a metal selected from the group consisting of calcium, sodium and potassium, concentrating the solution of the salt, adding a ketone to the concentrated solution to precipitate the salt, separating the salt from the supernatant liquid, drying the salt, suspending the salt in an organic liquid having sulphur dioxide dissolved therein and subjecting the suspension to the action of steam whereby the salt of the aliphatic acid reacts with the sulphur dioxide to form the aliphatic acid.

2. Process for the recovery of acetic acid from an aqueous solution thereof, which comprises neutralizing an aqueous solution of acetic acid to form the acetate of a metal selected from the group consisting of calcium, sodium and potassium, concentrating the solution of the metal acetate, adding acetone to the concentrated solution to precipitate the metal acetate, separating the metal acetate from the supernatant liquid, drying the metal acetate, suspending the metal acetate in an organic liquid having sulphur dioxide dissolved therein and subjecting the suspension to the action of steam whereby the acetate reacts with the sulphur dioxide to form acetic acid.

3. Process for the recovery of aliphatic acids from aqueous solutions thereof, which comprises neutralizing an aqueous solution of an aliphatic acid to form the aliphatic acid salt of a metal selected from the group consisting of calcium, sodium and potassium, concentrating the solution of the salt, adding a ketone to the concentrated solution to precipitate the salt, separating the salt from the supernatant liquid, drying the salt, suspending the salt in methyl acetate having sulphur dioxide dissolved therein and subjecting the suspension to the action of steam whereby the salt of the aliphatic acid reacts with the sulphur dioxide to form the aliphatic acid.

4. Process for the recovery of acetic acid from an aqueous solution thereof, which comprises neutralizing an aqueous solution of acetic acid to form the acetate of a metal selected from the group consisting of calcium, sodium and potassium, concentrating the solution of the metal acetate, adding acetone to the concentrated solution to precipitate the metal acetate, separating the metal acetate from the supernatant liquid, drying the metal acetate, suspending the metal acetate in methyl acetate having sulphur dioxide dissolved therein and subjecting the suspension to the action of steam whereby the acetate reacts with the sulphur dioxide to form acetic acid.

5. Process for the recovery of aliphatic acids from aqueous solutions thereof, which comprises treating an aqueous solution of an aliphatic acid with calcium hydroxide to form the calcium salt of the aliphatic acid, concentrating the solution of the calcium salt, adding a ketone to the concentrated solution to precipitate the calcium salt, separating the calcium salt from the supernatant liquid, suspending the calcium salt in methyl acetate saturated with sulphur dioxide and subjecting the suspension to the action of steam whereby the calcium salt of the aliphatic acid reacts with sulphur dioxide to form the aliphatic acid.

6. Process for the recovery of acetic acid from an aqueous solution thereof, which comprises treating an aqueous solution of acetic acid with calcium hydroxide to form calcium acetate, concentrating the solution of the calcium acetate, adding acetone to the concentrated solution to precipitate the calcium acetate, separating the calcium acetate from the supernatant liquid, drying the calcium acetate, suspending the calcium acetate in methyl acetate saturated with sulphur dioxide and subjecting the suspension to the action of steam whereby the calcium acetate reacts with the sulphur dioxide to form acetic acid.

7. Process for the recovery of acetic acid from an aqueous solution thereof, which comprises treating an aqueous solution of acetic acid with calcium hydroxide to form calcium acetate, concentrating the solution of calcium acetate to 20 to 25% concentration, adding acetone to the concentrated solution to precipitate the calcium acetate, separating the calcium acetate from the supernatant liquid, drying the calcium acetate, suspending the calcium acetate in methyl acetate saturated with sulphur dioxide and subjecting the suspension to the action of steam whereby the calcium acetate reacts with the sulphur dioxide to form acetic acid.

JOSEPH E. BLUDWORTH.